(No Model.)

I. WELTY.

WATERING ANIMALS.

No. 258,619. Patented May 30, 1882.

Witnesses.
A. Ruppert,
C. M. Connell

I. Welty
Inventor.
Holloway & Blanchard
Attorneys

UNITED STATES PATENT OFFICE.

ISAAC WELTY, OF OLNEY, ILLINOIS.

WATERING ANIMALS.

SPECIFICATION forming part of Letters Patent No. 258,619, dated May 30, 1882.

Application filed October 5, 1881. (No model.)

*To all whom it may concern:*

Be it known that I, ISAAC WELTY, a citizen of the United States, residing at Olney, in the county of Richland and State of Illinois, have invented certain new and useful Improvements in Apparatus for Watering Animals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an apparatus, for watering animals, of that type which is so constructed as to regulate the flow of water from a pond or other reservoir to the through from which the animals drink; and the object of my improvement is to provide a certain combination of devices which shall constitute a convenient and cheap watering-place for animals. I attain this object by the mechanism illustrated in the accompanying drawings, in which—

Figure 1:
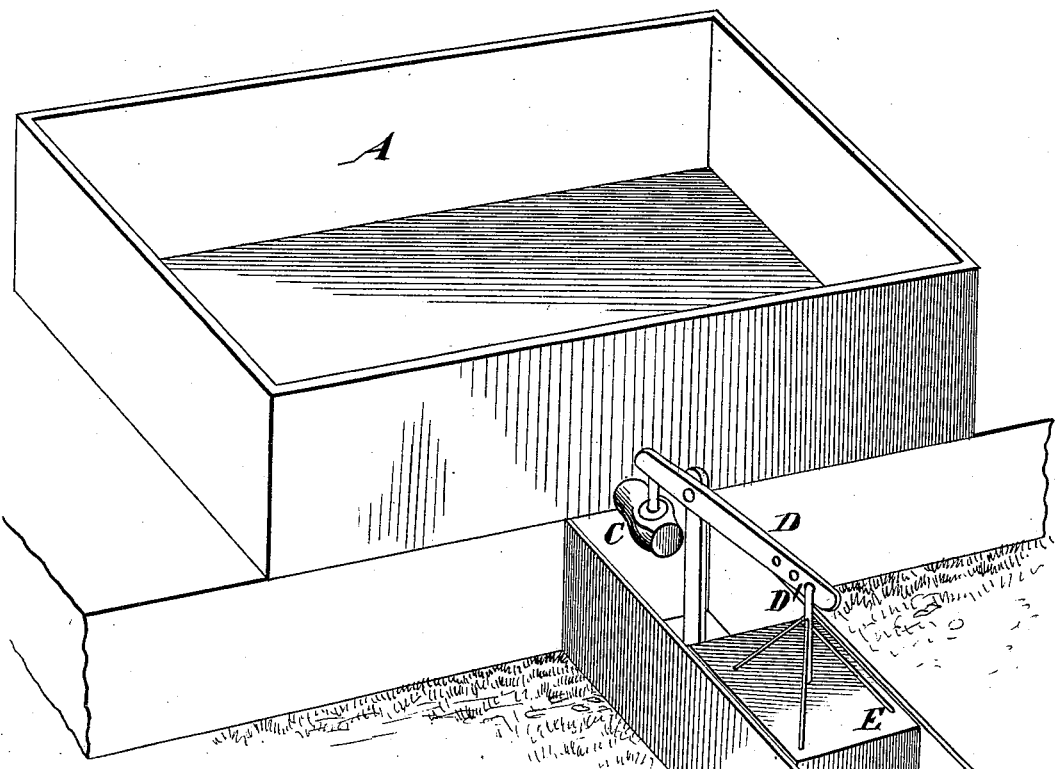
Figure 2:
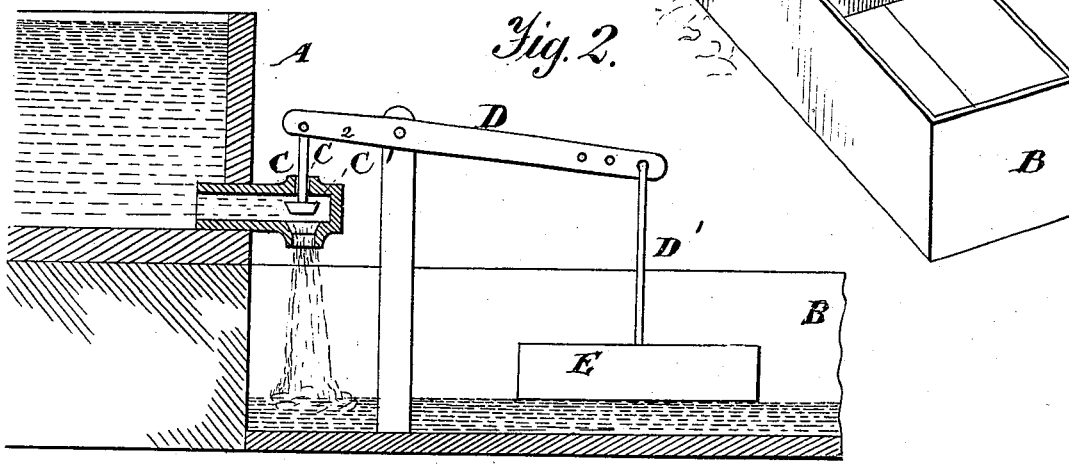

Figure 1 is a perspective view, showing a reservoir, a trough, a float, a valve, and mechanism for operating the same; and Fig. 2 is a sectional elevation, showing the construction and arrangement of the above-named parts.

Similar letters refer to similar parts throughout the several views.

In constructing an apparatus of this character there is provided a reservoir, A, which may consist of a depression formed in the earth, a pond caused by placing a dam across a running stream of water, or of a tank composed of wood or metal, the last-named device being used when the water for stock has to be pumped, as is the case in a large portion of the country. At any convenient point at the end or side of the reservoir is placed a trough, B, for the animals to drink from. This trough is by preference so arranged that its upper surface is about on a line with the bottom of the reservoir, in order that when the latter is filled by a pump all, or nearly all, of the water may be drawn out; but when desired or necessary the trough may be placed at a lower level.

For the purpose of permitting the water to flow from the reservoir A to the trough B there is inserted in the wall of said reservoir a pipe, C, which is provided with a horizontal opening leading from the reservoir into a vertical one, which directs the water into a trough. At the point where these openings meet there is provided a valve-seat upon which a valve, C', rests when the flow of water is to be arrested. This valve is secured to a rod, C², which passes up through the pipe C and is attached to a lever, D, the opposite end of which is provided with a series of holes or with other suitable means for adjusting upon it a rod or rods, D', which connect the lever to a float, E, placed in the trough B. The lever D is pivoted to an upright post or to any convenient device at a point between where the valve-rod C² and the rod D' are connected in such a manner that when the water falls in the trough the descent of the float will cause the valve C' to rise and allow an additional quantity to flow from the reservoir, which, when it has filled the trough to the required level, will cause the float to rise, and thus check the flow by forcing the valve to its seat, thus rendering the mechanism of the apparatus automatic in its operation.

In constructing floats for the purpose herein described preference is given to those that are made of non-corrosive sheet metal; but they may be made of wood or of any other buoyant material that will not absorb so much water as to render them inoperative, and which has sufficient specific gravity to cause it to fall when the water is removed from the trough, and thus open the valve.

For the purpose of providing against the changing weight of the float when made of wood or other substance which absorbs more or less water, and for regulating the lift of the valve, the lever D is provided at its outer end with a series of holes or other means for shifting the position of the float thereon, thus making it possible to cause a greater or less amount of water to flow into the trough in a given period of time.

When the apparatus is used in connection with a reservoir consisting of a pond such reservoir may be protected by a fence, and the animals excluded therefrom, which will insure their being supplied with pure water, or at least with water that has not been contaminated by their droppings or urine, and when used in connection with a reservoir into which water is pumped it affords the means of a fresh supply therefrom at all times.

Having thus described my invention, what I claim, and desire to secure by Letters Patent, is—

In an automatically-operating apparatus for watering stock, the combination of the reservoirs A and B, the pipe C, having a horizontal opening communicating with the reservoir A, and a vertical opening for the discharge of water into the reservoir B, said vertical opening being provided with a valve-seat for the automatically-operating valve to close upon, the float E, the graduated lever D, the valve C', and the connecting-rod D', the parts being constructed and arranged as shown and described.

In testimony whereof I affix my signature in presence of two witnesses.

ISAAC WELTY.

Witnesses:
G. D. SLANKER,
WM. MATTOON.